(12) United States Patent
Yoshida (10) Patent No.: US 7,012,707 B2
(45) Date of Patent: Mar. 14, 2006

(54) IMAGE FORMING APPARATUS UTILIZING T.33 PROTOCOL TO INCLUDE BOTH EXTENSIONS AND SECONDARY PHONE NUMBERS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 945 days.

(21) Appl. No.: 09/766,609

(22) Filed: Jan. 23, 2001

(65) Prior Publication Data

US 2002/0051224 A1    May 2, 2002

(30) Foreign Application Priority Data

Jan. 26, 2000   (JP)   .............................. 2000-016365
Nov. 2, 2000    (JP)   .............................. 2000-336063

(51) Int. Cl.
  G06F 15/00   (2006.01)
  H04N 1/00    (2006.01)
  H04M 11/00   (2006.01)

(52) U.S. Cl. ..................... 358/1.15; 358/407; 358/438; 358/440; 379/100.09; 379/100.17

(58) Field of Classification Search ............... 358/1.15, 358/402, 407, 434–440; 370/352; 379/100.17, 379/100.09

See application file for complete search history.

(56) References Cited

U.S. PATENT DOCUMENTS

| | | | |
|---|---|---|---|
| 4,554,592 A | 11/1985 | Yoshida | 358/257 |
| 4,609,927 A | 9/1986 | Yoshida | 346/154 |
| 4,677,660 A | 6/1987 | Yoshida | 379/100 |
| 4,727,576 A | 2/1988 | Yoshida | 379/100 |
| 5,189,696 A | 2/1993 | Yoshida | 379/355 |
| 5,206,743 A * | 4/1993 | Hochman et al. | 358/440 |
| 5,255,311 A | 10/1993 | Yoshida | 379/100 |
| 5,257,114 A | 10/1993 | Yoshida et al. | 358/448 |
| 5,345,517 A | 9/1994 | Katayama et al. | 382/54 |
| 5,448,654 A | 9/1995 | Katayama et al. | 382/298 |
| 5,585,939 A | 12/1996 | Yoshida | 358/438 |
| 5,619,344 A | 4/1997 | Yoshida et al. | 358/468 |
| 5,640,250 A | 6/1997 | Yoshida | 358/468 |

(Continued)

FOREIGN PATENT DOCUMENTS

JP           10304166 A  * 11/1998

OTHER PUBLICATIONS

International Telecommunication Union. "Facsimile routing Utilizing the Subaddress", Jul. 1996, ITU-T.33, All.*

*Primary Examiner*—Edward Coles
*Assistant Examiner*—Chan S. Park
(74) *Attorney, Agent, or Firm*—Fitzpatrick, Cella, Harper & Scinto (57) ABSTRACT

A facsimile apparatus transmitting a subaddress signal includes an extension number input block for inputting a plurality of extension numbers, a second telephone number input block for inputting a plurality of secondary telephone numbers, and a direct input block for inputting particular information through numeric keys, an asterisk (*) key and a sharp (#) key. When the subaddress signal is directly input in the facsimile transmission, with one of the symbols # and ## input and the subaddress signal happens to coincide with the definition of the signal specified in the ITU-T Recommendation T. 33, an operator checks to see whether the transmission of the signal complied with the signal format of the ITU-T Recommendation T. 33 is selected. The facsimile transmission is thus performed as the operator intends.

6 Claims, 10 Drawing Sheets

U.S. PATENT DOCUMENTS

| | | | |
|---|---|---|---|
| 5,659,401 A | 8/1997 | Yoshida | 358/442 |
| 5,682,248 A | 10/1997 | Yoshida | 358/404 |
| 5,717,744 A | 2/1998 | Yoshida et al. | 379/100 |
| 5,724,441 A | 3/1998 | Yoshida | 382/166 |
| 5,784,179 A | 7/1998 | Yoshida | 358/498 |
| 5,894,543 A | 4/1999 | Yoshida et al. | 395/113 |
| 5,966,430 A | 10/1999 | Yoshida | 379/100.15 |
| 5,991,290 A * | 11/1999 | Malik | 370/352 |
| 6,046,824 A * | 4/2000 | Barak | 358/400 |
| 6,088,129 A | 7/2000 | Yoshida | 358/439 |
| 6,097,797 A * | 8/2000 | Oseto | 379/100.08 |
| 6,104,500 A * | 8/2000 | Alam et al. | 358/1.15 |
| 6,141,109 A | 10/2000 | Yoshida | 358/1.12 |
| 6,281,987 B1 * | 8/2001 | Yoshida | 358/434 |
| 6,384,927 B1 * | 5/2002 | Mori | 358/1.15 |
| 6,449,062 B1 * | 9/2002 | Endo | 358/400 |
| 6,529,293 B1 * | 3/2003 | Otsuka | 358/434 |
| 6,639,689 B1 * | 10/2003 | Kuwahara | 358/1.15 |

\* cited by examiner

BUTTON 28 — EXTENSION NUMBER INPUT BUTTON 28

BUTTON 30 — SECONDARY TELEPHONE NUMBER INPUT BUTTON 30

BUTTON 26 — SUBADDRESS SIGNAL DIRECT INPUT BUTTON 26

1 — NUMERIC KEYS, # KEY, * KEY

SET — SET KEY

FIG. 9B
USER KEYSTROKE SEQUENCE FOR INPUT OF PLURALITY OF EXTENSION NUMBERS

FIF CONTENT OF SUBADDRESS 123#456

FIG. 9C
USER KEYSTROKE SEQUENCE FOR INPUT OF PLURALITY OF SECONDARY TELEPHONE NUMBERS

FIF CONTENT OF SUBADDRESS #1234##4567

FIG. 9D
USER KEYSTROKE SEQUENCE FOR INPUT OF EXTENSION NUMBER AND SECONDARY TELEPHONE NUMBER

FIF CONTENT OF SUBADDRESS 123##1234

FIG. 9E
USER KEYSTROKE SEQUENCE FOR DIRECT INPUT OF SUBADDRESS SIGNAL

FIF CONTENT OF SUBADDRESS 12#45##1234

FIG. 10

IMAGE FORMING APPARATUS UTILIZING T.33 PROTOCOL TO INCLUDE BOTH EXTENSIONS AND SECONDARY PHONE NUMBERS

BACKGROUND OF THE INVENTION

1. Field of the Invention

The present invention relates to an image communication apparatus, for example, a facsimile apparatus, which transmits a subaddress signal.

2. Description of the Related Art

There are two techniques for designating a subaddress signal in conventional facsimile apparatus that transmits a subaddress signal: in one method, a partner facsimile receiver designates a subaddress by a character string formed of numbers (0 through 9), an asterisk (*), and a sharp (#), and in the other method, a partner facsimile receiver designates a plurality of numbers specified in the ITU-T Recommendation T. 33.

When a subaddress of symbols, such as # and ##, is directly input in the conventional facsimile apparatus, the resulting subaddress signal may happen to coincide with a signal defined by the ITU-T Recommendation T. 33. In this case, it is difficult to discriminate between a case in which an operator intentionally transmits a subaddress in a character string including the symbols # and ##, and another case in which the operator transmits a subaddress signal including the symbols # and ## in compliance with the ITU-T Recommendation T. 33.

Consequently, if the subaddress signal is directly transmitted by a conventional image communication/facsimile apparatus, the receiver may not work in the way intended by the operator.

SUMMARY OF THE INVENTION

It is an object of the present invention to provide an image communication apparatus which allows an operator to determine whether a signal format complying with the ITU-T Recommendation T. 33 is selected when a directly input subaddress signal, including the symbols # and ##, happens to coincide with a signal specified in the ITU-T Recommendation T. 33 in a facsimile transmission, and communicates in the way the operator intends.

One aspect of the present invention is directed to an image communication apparatus which transmits a subaddress signal. This apparatus includes an extension number input means for inputting a plurality of extension numbers as information of the subaddress signal, a secondary telephone number input means for inputting a plurality of secondary telephone numbers, a direct input means for directly inputting particular information, and display means for displaying an acknowledge message which is to confirm whether to send the particular information as information in accordance with ITU-T Recommendation T-33 when the particular information is input from the direct input means, wherein the subaddress signal, with the plurality of the extension numbers designated by the extension number input means for inputting the plurality of the extension numbers, or the plurality of the secondary telephone numbers designated by the secondary telephone number input means for inputting the plurality of the secondary telephone numbers, or both the extension number and the secondary telephone number designated by the direct input means for directly inputting the particular information, is transmitted, and a message is displayed if a communication error occurs after the transmission of a SUB/DCS signal.

Preferably, the particular information input by the direct input means is one of the symbols # and ##, and when the input of a plurality of pieces of numerical information delimited by one of the symbols # and ## is selected, a message is displayed to prompt a user to acknowledge the designation of a plurality of extension numbers, the designation of a plurality of secondary telephone numbers, or the designation of an extension number and a secondary telephone number.

The displayed message is preferably changed in response to the information of the directly input subaddress.

The subaddress signal, with the plurality of the extension numbers designated by the extension number input means for inputting the plurality of the extension numbers, or the plurality of the secondary telephone numbers designated by the secondary telephone number input means for inputting the plurality of the secondary telephone numbers, or both the extension number and the secondary telephone number designated by the direct input means for directly inputting the particular information, is transmitted, and a message is preferably displayed if a communication error occurs after the transmission of a SUB/DCS signal.

Preferably, the displayed message prompts a user to check to see whether the partner apparatus has one of the function of receiving the plurality of the extension numbers, the function of receiving the plurality of the secondary telephone numbers, and the function of receiving both the extension number and the secondary telephone number.

Preferably, the image communication apparatus is a facsimile apparatus.

Another aspect of the present invention is an image communication apparatus transmitting a subaddress signal. The apparatus includes: (1) extension number input means for inputting a plurality of extension numbers as information of the subaddress signal; (2) secondary telephone number input means for inputting a plurality of secondary telephone numbers; (3) direct input means for directly inputting particular information; (4) determination means for determining whether or not the particular information, which is a plurality of extension numbers as information of subaddress signal or a plurality of secondary telephone numbers, is inputted in accordance with ITU-T Recommendation T. 33 by the direct input means; and (5) display means for displaying an acknowledge message when the particular information is inputted from the direct input means and when the plurality of extension numbers as information of the subaddress signal or a plurality of secondary telephone numbers are determined to be inputted in accordance with ITU-T Recommendation T. 33 by the determination means.

Further objects, features, and advantages of the invention will be apparent from the following description of the preferred embodiments with reference to the attached drawings.

DESCRIPTION OF THE PREFERRED EMBODIMENTS

First embodiment

Figure 1:
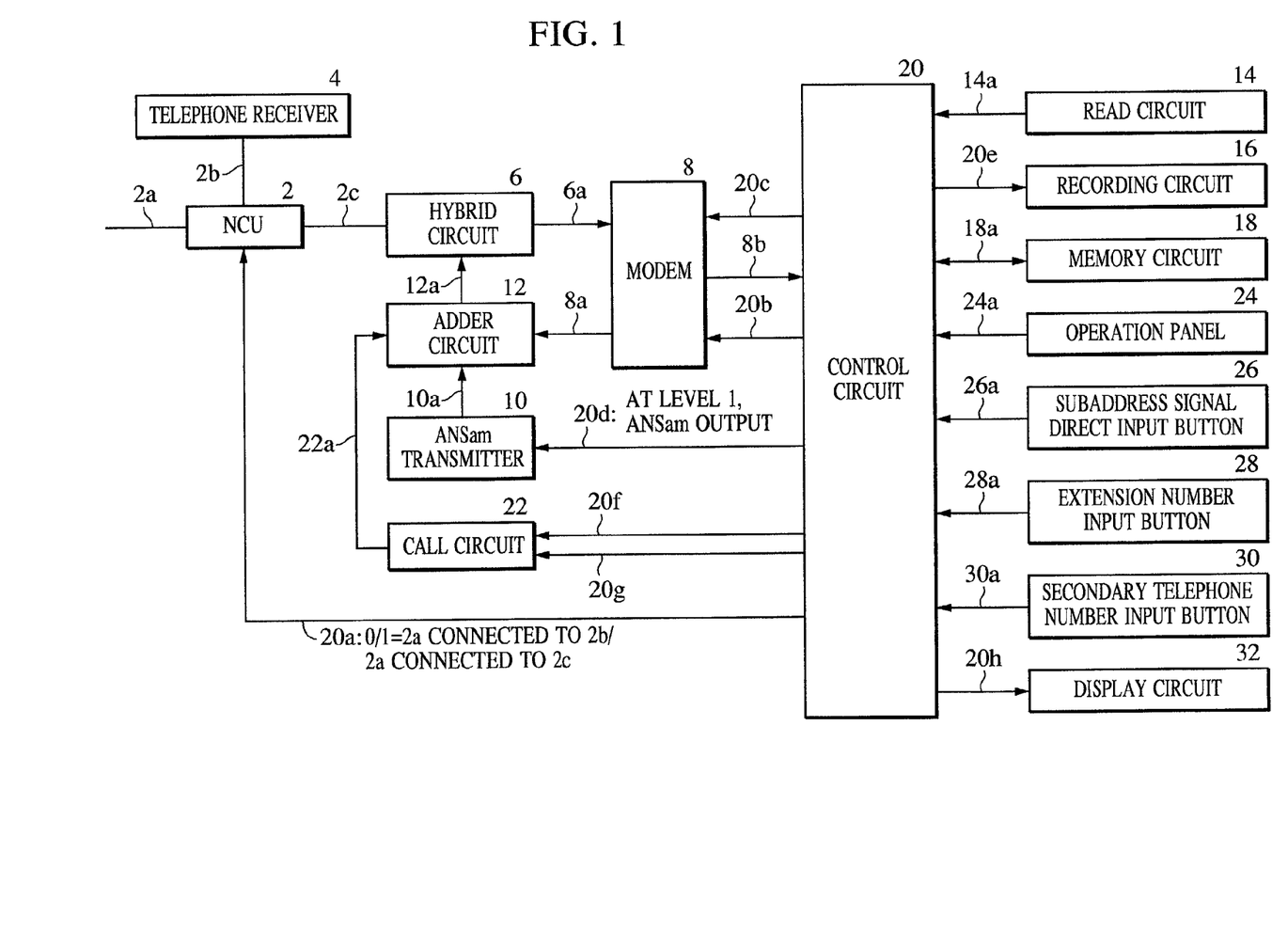
FIG. 1 is a block diagram showing a facsimile apparatus of a first embodiment of the present invention.

FIG. 1 is a block diagram showing a facsimile apparatus FS1 of a first embodiment of the present invention.

A NCU (network control unit) 2 uses a telephone line for data communications, connecting a terminal to the line, controlling the connection of a telephone exchange, switching data communication lines, and maintaining a loop. The NCU 2 connects a telephone line 2a to a telephone 4 through a signal line 2b when the signal level (of the signal line 20a) is at level "0", and connects the telephone line 2a to a facsimile apparatus when the signal level is at level "1". In normal operation, the telephone line 2a remains connected to the telephone 4.

A hybrid circuit 6 separates the signals to be transmitted from the signals to be received through a signal line 2c. The hybrid circuit 6 transfers transmission signals from an adder circuit 12 to the telephone line 2a via the NCU 2, and receives signals from a partner station via the NCU 2 and then transmits the received signals to a modern unit 8 through a signal line 6a.

The modem unit 8 performs modulation and demodulation in compliance with the ITU-T Recommendations V. 8, V. 21, V27ter, V. 29, V. 17, and V. 34, and receives transmission mode command through a signal line 20c. The modem unit 8 receives a signal via a signal 20b, and outputs modulated data via a signal line 8a, receives a signal via a signal line 6a, and outputs demodulated data via a signal line 8b.

A circuit 10 outputs an ANSam signal over a signal line 10a when a signal at a "1" level is conducted over a signal line 20d, and outputs no signal over the signal line 10a when a signal at a "0" level is conducted over the signal line 20d.

The adder circuit 12 receives information through the signal line 8a, and information through a signal line 22a, and outputs the result of addition over a signal line 12a.

A read circuit 14 outputs read data over a signal line 14a.

A recording circuit 16 successively records information output over a signal line 20e, on a one-line-at-time basis.

A memory circuit 18 is used to store, via a signal line 18a, raw information of the read data or coded information of the read data, and received information or demodulated received information.

A call circuit 22 receives telephone number information output over a signal line 20g when a call command pulse is generated over a signal line 20f. The call circuit 22 outputs a DTMF (dual tone multi-frequency) selection signal over a signal line 22a.

An operation panel 24 includes touchpad keys for dialing or short-cut dialing, numeric keys, asterisk (*) key, sharp (#) key, set key, start key, stop key, and other function keys, and outputs, over a signal line 24a, key information in response to the pressing of any key.

A subaddress signal direct input button 26 is pressed to directly input a subaddress signal. In response to the pressing of this button, a pulse is output over a signal line 26a.

An extension number input button 28 is pressed to input an extension number as information of subaddress signal. In response to the pressing of this button, a signal is output over a signal line 28a.

A secondary telephone number button 30 is pressed to input a secondary telephone number. In response to the pressing of this button, a signal is output over a signal line 30a.

A display circuit 32 receives information output over a signal line 20h and displays the information.

The control circuit 20 in a facsimile apparatus transmitting a subaddress signal includes an extension number input block for inputting a plurality of extension numbers as information of a subaddress signal, a secondary telephone number input block for inputting a plurality of secondary telephone numbers, and a direct input block composed of the numeric keys, asterisk (*) and sharp (#) keys. The control circuit 20 displays an acknowledge message when particular information is input by the direct input block.

The particular information input through the direct input block is one the symbols # and ##, for instance. When the input of a plurality of pieces of numeric information delimited by one of the symbols # and ## is selected, the control circuit 20 displays one of the messages "Designation of a plurality of extension numbers?", "Designation of a plurality of secondary telephone numbers?", and "Designation of both an extension number and a secondary telephone number?". The information of the subaddress signal directly input is used to display the remaining message instead of the one of the above messages displayed.

The subaddress signal, with the plurality of the extension numbers designated by the extension number input block for inputting the plurality of the extension numbers, or the plurality of the secondary telephone numbers designated by the secondary telephone number input block for inputting the plurality of the secondary telephone numbers, or both the extension number and the secondary telephone number designated by the direct input block for directly inputting the particular information, is transmitted, and a communication error occurs after the transmission of a SUB/DCS signal, a display unit displays a message prompting a user to telephone a partner to check whether the partner receiver has one of the function of receiving the plurality of the extension numbers, the function of receiving the plurality of the secondary telephone numbers, and the function of receiving both the extension number and the secondary telephone number.

FIG. 2 through FIG. 8 are flow diagrams showing the control operation of the control circuit 20. FIGS. 9A through 9E shows user keystroke sequences.

Figure 9A:
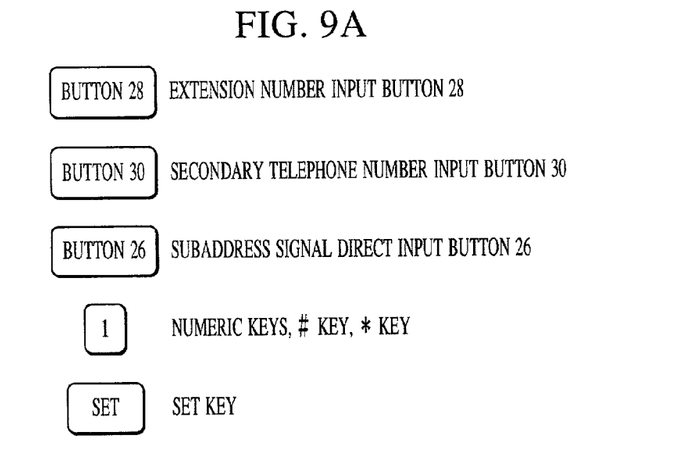
FIGS. 9A–9E show user keystroke sequences.

FIG. 9A shows an extension number input button ("BUTTON 28"), a secondary telephone number input button ("BUTTON 30"), a subaddress signal direct input button ("BUTTON 26") and an example of a numeric key ("1"), the numeric keys including "1" through "9" and "0", a "#" key, a "*" key, and a set key ("SET") to determine an inputted extension number or secondary telephone number.

Figure 9B:
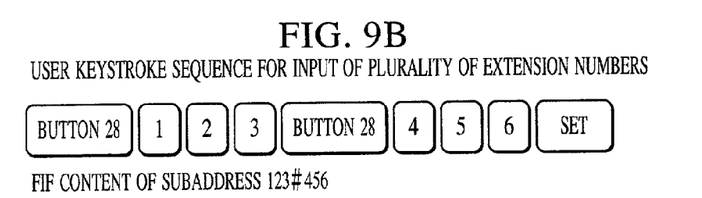

FIG. 9B shows an operational example of a user inputting a plurality of extension numbers. A subaddress "123#456" is inputted by pressing buttons in order from the left of the drawing.

Figure 9C:
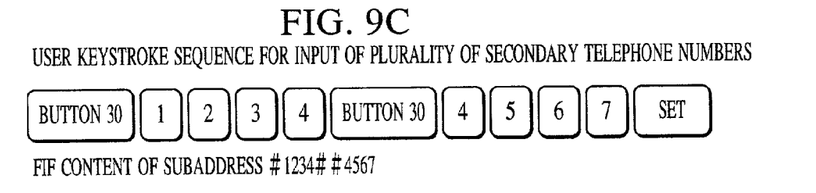

FIG. 9C shows an operational example of a user inputting a plurality of secondary telephone numbers. A subaddress "#1234##4567" is inputted by pressing buttons in order from the left of the drawing.

Figure 9D:
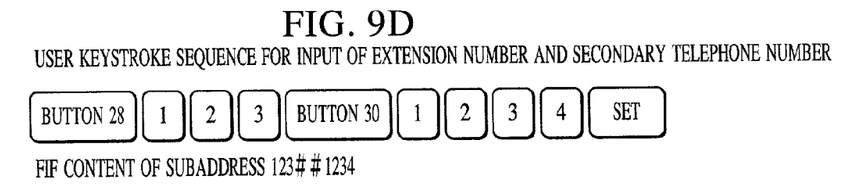

FIG. 9D shows an operational example of a user inputting an extension number and a secondary telephone number. A subaddress "123##1234" is inputted by pressing buttons in order from the left of the drawing.

Figure 9E:
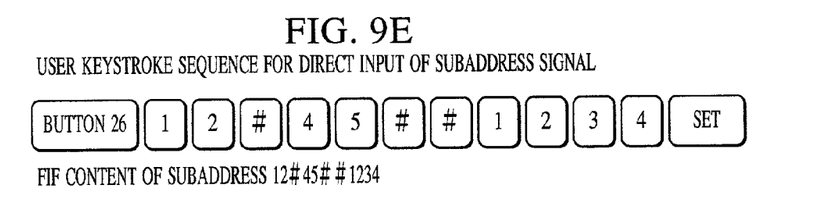

FIG. 9E shows an operational example of a user inputting a subaddress signal directly. A subaddress "12#45##1234" is inputted by pressing buttons in order from the left of the drawing.

Figure 2:
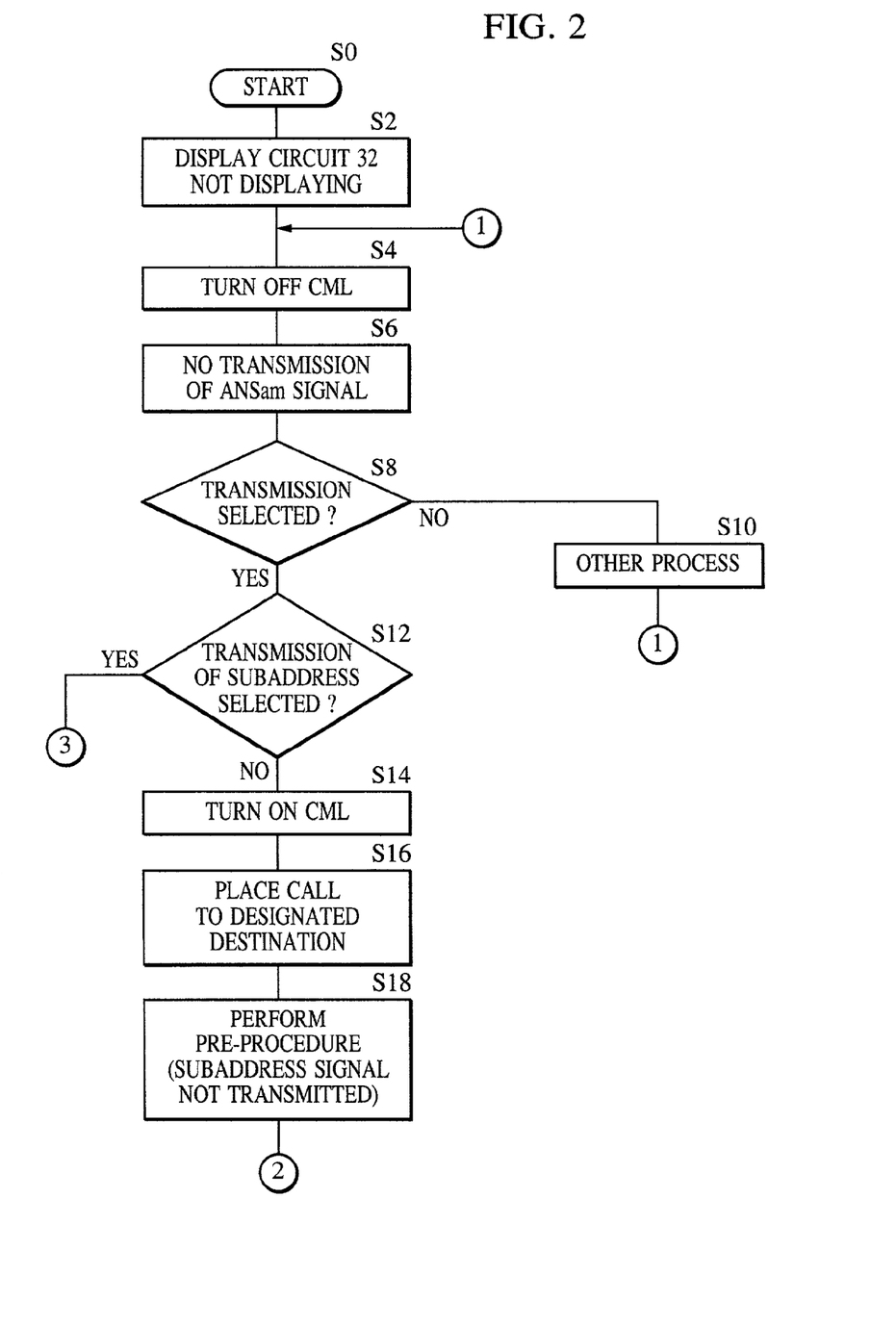
FIG. 2 is a flow diagram showing the control operation carried out by a control circuit in the first embodiment.

In step S2, the display circuit 32 does not display through the signal line 20h. In step S4, the control circuit 20 outputs a signal at a "0" level over the signal line 20a, turning off the CML (Communication Line). In step S6, the control circuit 20 outputs a signal at a "0" level over the signal line 20d, thereby outputting no ANSam signal.

In step S8, the control circuit 20 receives the information from the signal line 24a and determines whether transmission has been selected. When it is determined that the transmission has been selected, the process goes to step S12. When it is determined that no transmission is selected, the process goes to step S10 for other process. In step S8, it is determined that the transmission has been selected when the user inputs a destination.

In step S12, the control circuit 20 receives signals over signal lines 24a, 26a, 28a, and 30a, and determines whether the transmission of a subaddress signal has been selected. When it is determined that the transmission of the subaddress signal has been selected, the process goes to step S24. When it is determined that the transmission of the subaddress signal has not been selected, the process goes to step S14. In step S12, the control circuit 20 monitors signals for a duration of 5 to 10 seconds whether the user starts an operation for the transmission of the subaddress. When the transmission is started within the duration of time, the process thus goes to step S24, else the process goes to step S14.

In step S14, the control circuit 20 outputs a signal at a "1" level over the signal line 20a, turning on the CML. In step S16, the call circuit 22 places a call to a designated destination. In step S18, a pre-procedure is carried out. No subaddress signal is transmitted here.

In step S20, a video signal is transmitted, and in step S22, a post-procedure is carried out.

Figure 3:
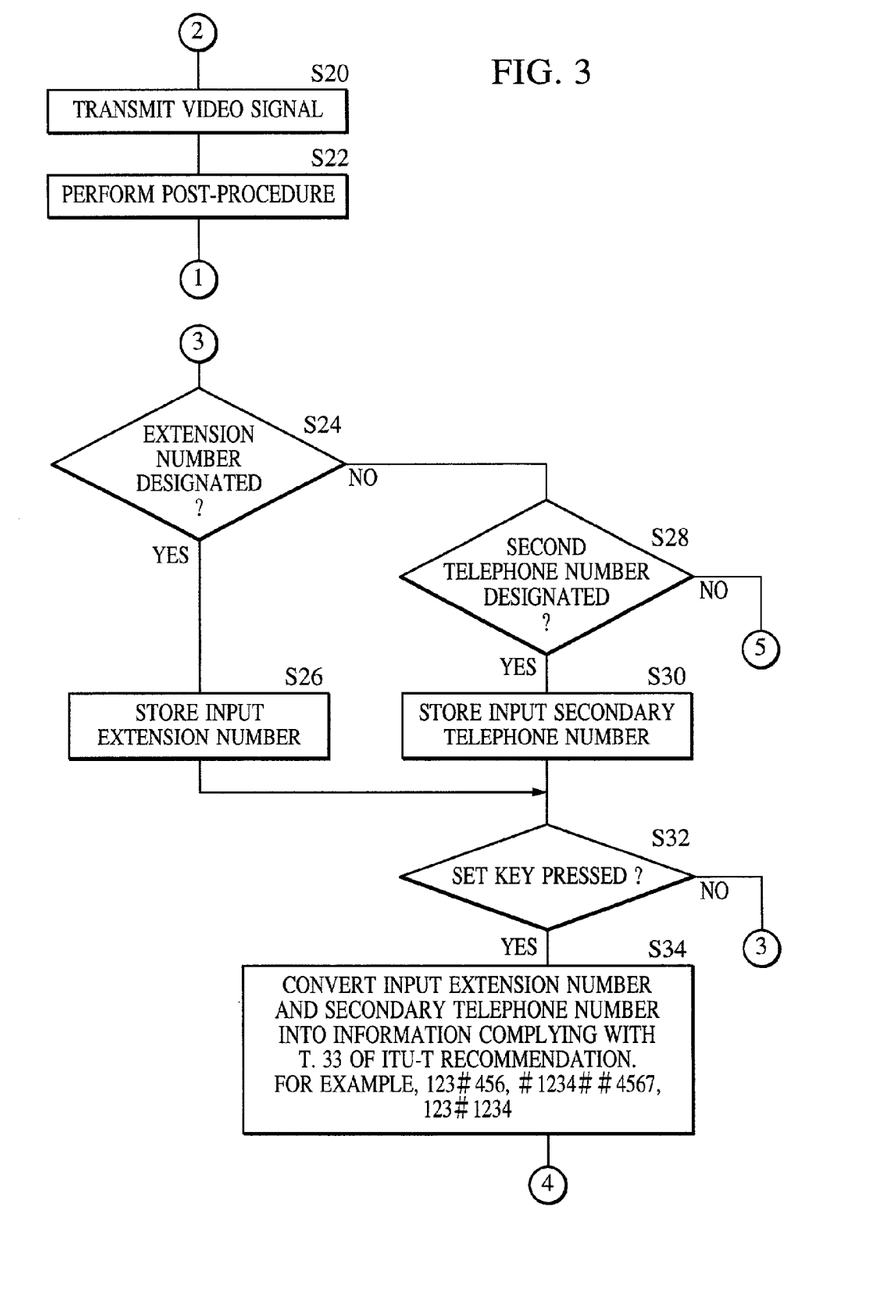
FIG. 3 is a flow diagram showing the control operation of the control circuit.

In step S24, the control circuit 20 determines whether the extension number has been designated by pressing the extension number input button 28. When it is determined that the extension number has been designated, the process goes to step S26, where the input extension number is stored (the user inputs neither # nor ## here). When it is determined that the extension number has not been designated, the process goes to step S28.

In step S28, the control circuit 20 determines whether the secondary telephone number has been designated by pressing the secondary telephone number button 30. When it is determined that the secondary telephone number has been designated, the process goes to step S30, where the input secondary telephone number is stored (the user inputs neither # nor ## here). When it is determined that the secondary telephone number has not been designated, the process goes to step S36.

In step S32, the control circuit 20 determines whether the set key has been pressed. When it is determined that the set key has been pressed, the process goes to step S34, else the process goes to step S24.

In step S34, the input extension number and the input secondary telephone number are converted into information complying with the ITU-T Recommendation T. 33. For instance, assuming a first input extension number of 123 and a second input extension number of 456, resulting numbers become 123#456. Assuming a first secondary telephone number of 1234 and a second secondary telephone number of 4567, resulting numbers become #1234##4567. Assuming an input extension number of 123 and an input secondary telephone number of 1234, resulting numbers become 123##1234. The process goes to step S94 shown in FIG. 7 from step S34.

Figure 4:
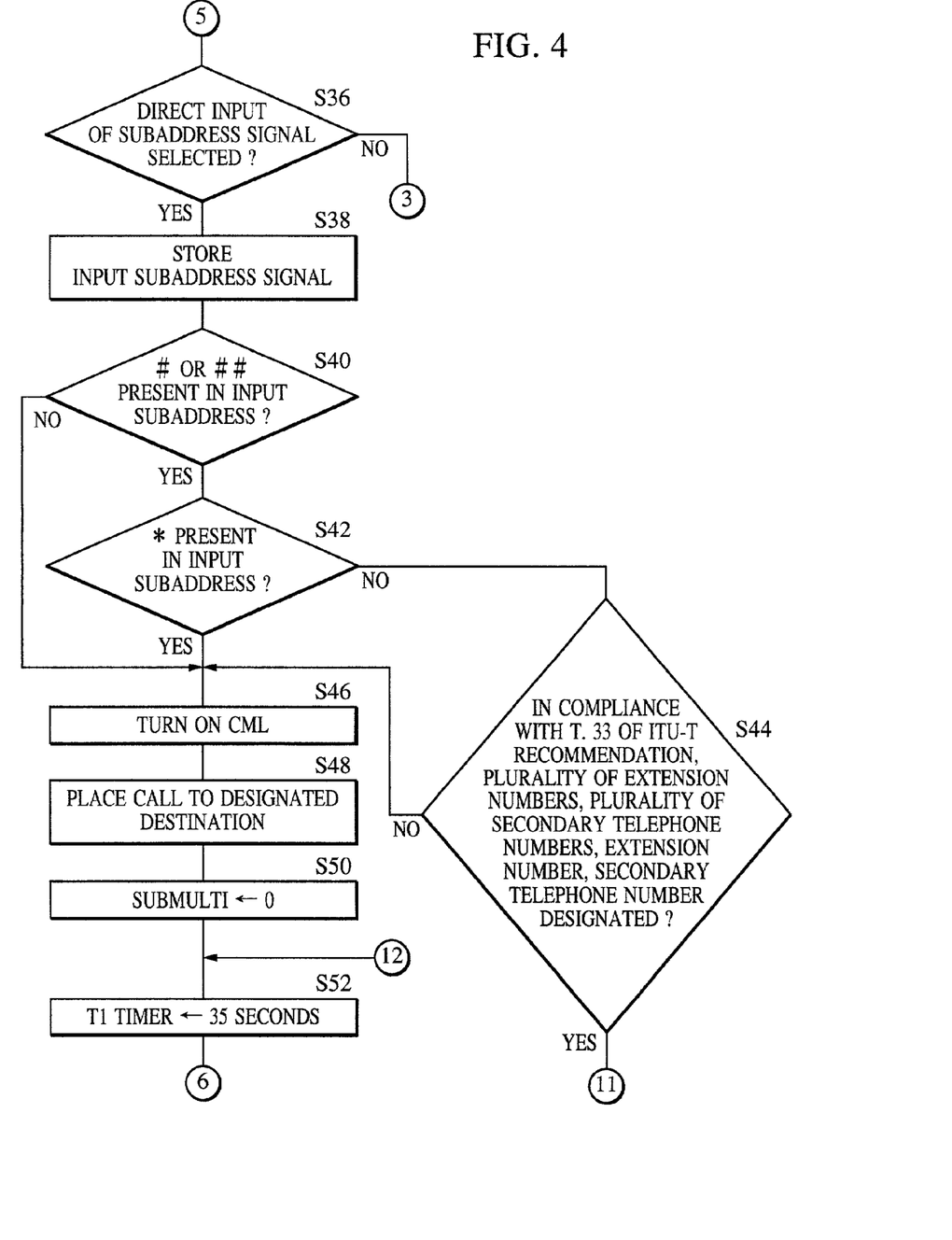
FIG. 4 is a flow diagram showing the control operation of the control circuit.

In step S36, the control circuit 20 determines whether the direct input of the subaddress signal has been selected by pressing the subaddress signal direct input button 26. When it is determined that the direct input of the subaddress signal has been selected, the process goes to step S38, where the input subaddress signal is stored. When it is determined that the direct input of the subaddress has not been selected, the process goes to step S24. The direct input of the subaddress signal in step S38 ends with the pressing of the set key, and then the process goes to step S40.

In step S40, the control circuit 20 determines whether one of the symbols # and ## is included in the subaddress just input. When it is determined that one of the symbols # and ## is present, the process goes to step S42, else the process goes to step S46.

In step S42, the control circuit 20 determines whether an asterisk (*) is included in the subaddress just input. When it is determined that an asterisk (*) is present, the process goes to step S46, else the process goes to step S44.

In step S44, the control circuit 20 determines whether the plurality of the extension numbers, the plurality of the secondary telephone numbers, or both the extension number and the telephone number, in compliance with the ITU-T Recommendation T. 33, have been designated. When it is determined that these numbers have been designated, the process goes to step S82 shown in FIG. 7, else the process goes to step S46.

Figure 5:
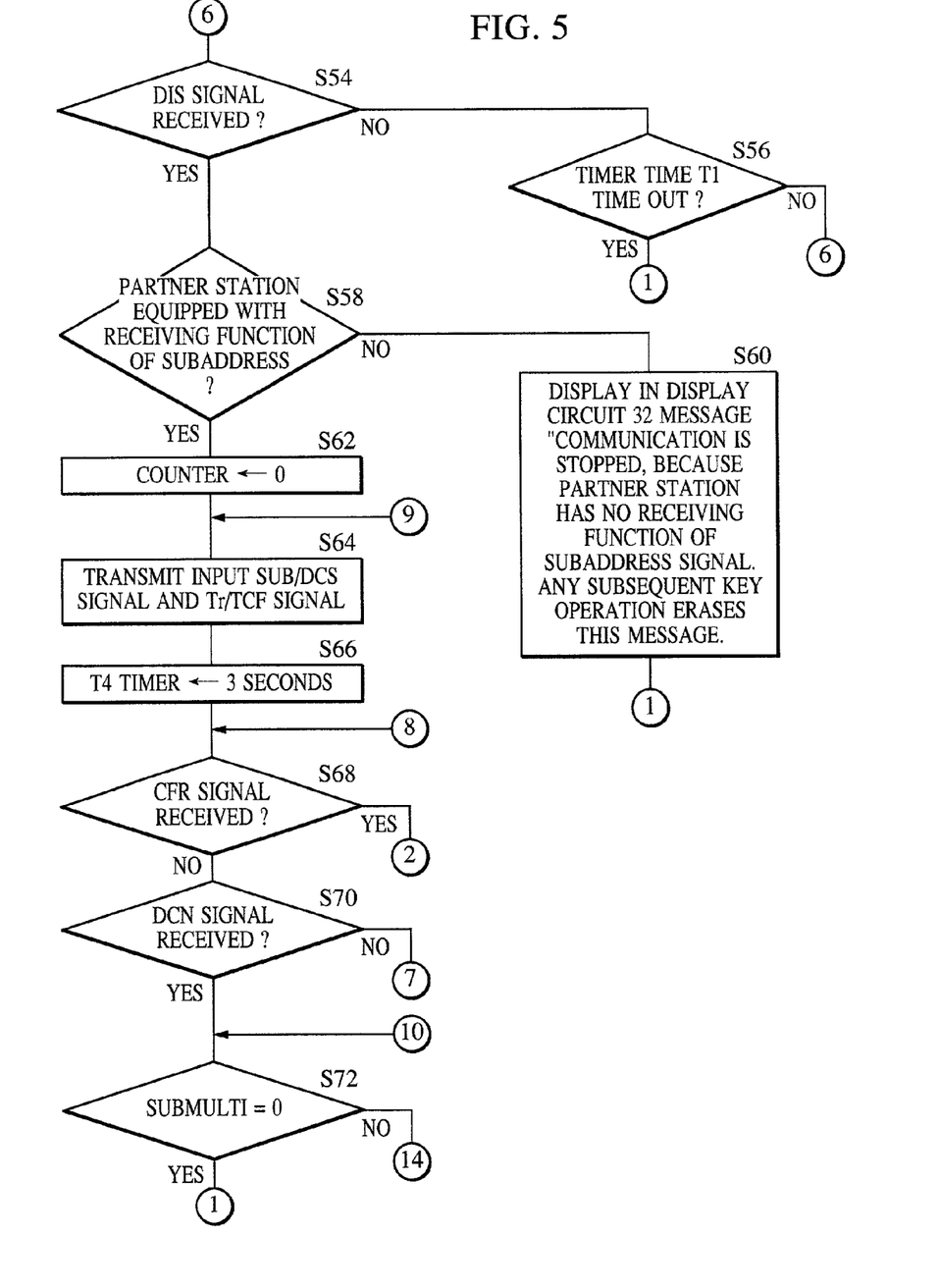
FIG. 5 is a flow diagram showing the control operation of the control circuit.

In step S46, the control circuit 20 outputs a signal at level "1" over the signal line 20a, turning on the CML. In step S48, the call circuit 22 places a call to a designated destination. In step S50, a SUBMULTI flag is cleared, and in step S52, a duration of 35 seconds is set in a T1 timer.

In step S54, the control circuit 20 determines whether a DIS signal has been received. When it is determined that the DIS signal has been received, the process goes to step S58, else the process goes to step S56.

In step S56, the control circuit 20 determines whether the T1 timer has timed out. When it is determined that the T1 timer has timed out, the process goes to step S4, else the process goes to step S54.

In step S58, the control circuit 20 determines whether a partner apparatus has the function of receiving the subaddress signal. When it is determined that the partner apparatus has the function of receiving the subaddress signal, the process goes to step S62, else the process goes to step S60.

In step S60, the control circuit 20 indicates on the display circuit 32 through the line 20h a message stating that communication is discontinued because of the partner apparatus having no subaddress receiving function. Any subsequent key operation will erase this message.

Figure 6:
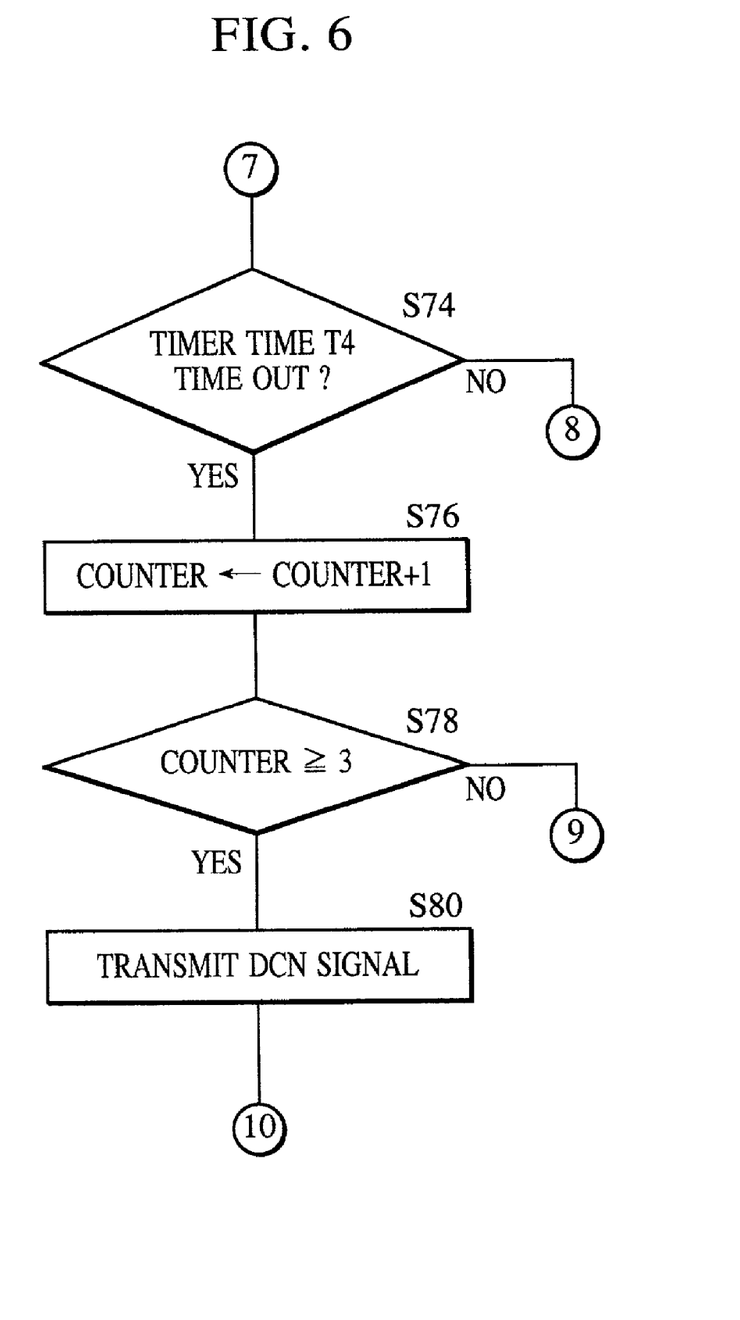
FIG. 6 is a flow diagram showing the control operation of the control circuit.

In step S62, a zero is set in a counter. In step S64, input SUB/DCS (digital command signal) signal and then Tr (training)/TCF (training check field) signal are transmitted.

In step S66, a duration of 3 seconds is set in a T4 timer.

In step S68, the control circuit 20 determines whether a CFR (confirmation to receive) signal has been received. When it is determined that the CFR signal has been received, the process goes to step S20, else the process goes to step S70.

In step S70, the control circuit 20 determines whether a DCN (disconnect) signal has been received. When it is determined that the DCN signal has been received, the process goes to step S72, else the process goes to step 74.

In step S72, the control circuit 20 determines whether the flag SUBMULTI is zero. When it is determined that the flag SUBMULTI is zero, the process goes to step S4, else the process goes to step S100.

In step S74, the control circuit 20 determines whether the timer T4 has timed out. When it is determined that the timer T4 has timed out, the process goes to step S76, else the process goes to step S68.

In step S76, the counter increments the count thereof by one.

In step S78, the control circuit 20 determines whether the count at the counter is three or greater. When it is determined that the count at the counter is three or greater, the process goes to step S80, where the DCN is transmitted. When it is determined in step S78 that the count at the counter is not greater than three, the process goes to step S64.

Figure 7:
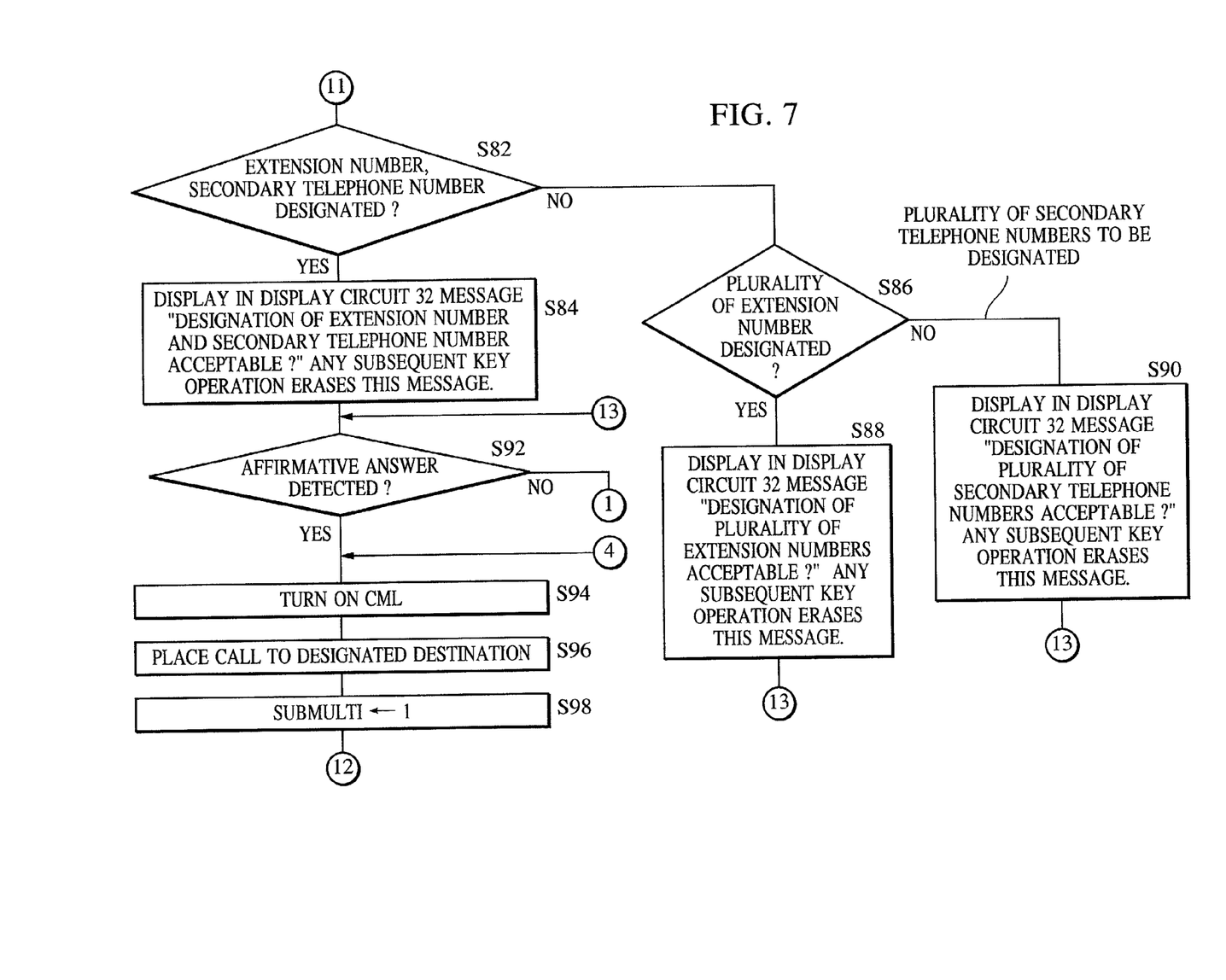
FIG. 7 is a flow diagram showing the control operation of the control circuit.

In step S82, the control circuit 20 determines whether both the extension number and the secondary telephone number have been designated. When it is determined the two numbers have been designated, the process goes to step S84, else the process goes to step S86.

In step S84, the control circuit 20 displays on the display circuit 32 through the signal line 20h a message "The designation of both the extension number and the secondary number is acceptable?". Any subsequent key operation will erase the message.

In step S86, the control circuit 20 determines whether the plurality of the extension numbers have been designated. When it is determined that the plurality of the extension numbers have been designated, the process goes to step S88, else the process goes to step S90.

In step S88, the control circuit 20 displays on the display circuit 32 through the signal line 20h a message "The designation of the plurality of extension numbers is acceptable?". Any subsequent key operation will erase the message.

In step S90, the control circuit 20 displays on the display circuit 32 through the signal line 20h a message "The designation of the plurality of the secondary numbers is acceptable?". Any subsequent key operation will erase the message.

In step S92, the control circuit 20 receives the signal at level "1" via the signal line 24a, and determines whether the answer to each of the questions in steps S84, S88, and S89 is affirmative. When it is determined that the answer is affirmative, the process goes to step S94, else the process goes to step S4.

In step S94, the control circuit 20 outputs a signal at level "1" over the signal line 20a, turning on the CML. In step S96, the call circuit 22 places a call to a designated destination. In step S98, the flag SUBMULTI is set to 1.

Figure 8:
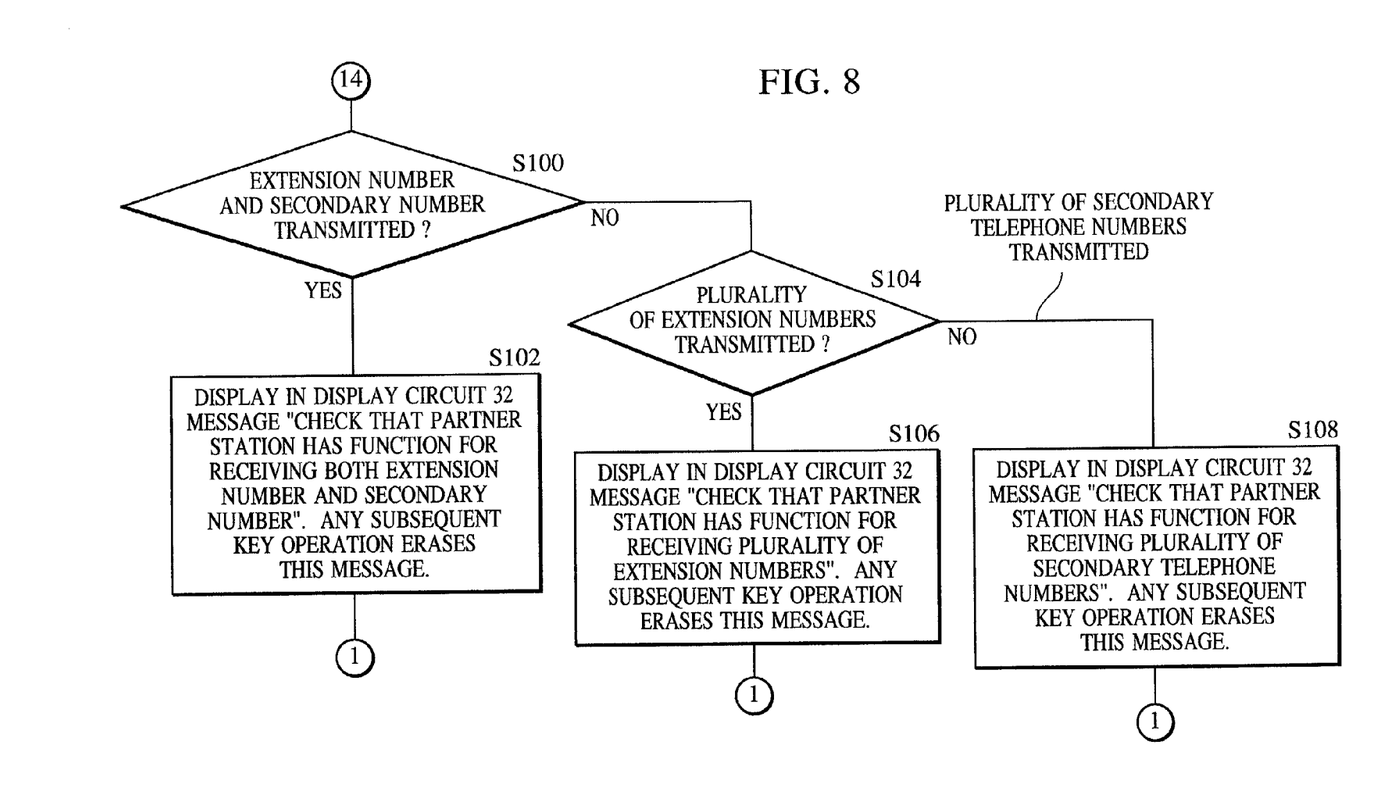
FIG. 8 is a flow diagram showing the control operation of the control circuit.

In step S100, the control circuit 20 determines whether both the extension number and the secondary telephone number have been transmitted. When it is determined that the two numbers have been transmitted, the process goes to step S102, else the process goes to step S104.

In step S102, the control circuit 20 displays on the display circuit 32 through the signal line 20h a message "Check to see whether the partner apparatus has the function of receiving both the extension number and the secondary telephone number". Any subsequent key operation will erase the message.

In step S104, the control circuit 20 determines whether the plurality of the extension numbers have been transmitted. When it is determined that the plurality of the extension numbers have been transmitted, the process goes to step S106, else the process goes to step S108.

In step S106, the control circuit 20 displays on the display circuit 32 through the signal line 20h a message "Check to see whether the partner apparatus has the function of receiving the plurality of the extension numbers". Any subsequent key operation will erase the message.

In step S108, the control circuit 20 displays on the display circuit 32 through the signal line 20h a message "Check to see whether the partner apparatus has the function of receiving the plurality of the secondary telephone numbers". Any subsequent key operation will erase the message.

In the first embodiment, the subaddress signal is directly input in the facsimile transmission, with one of the symbols # and ## input. When the subaddress signal happens to coincide with a signal specified in the ITU-T Recommendation T. 33, the operator checks to see whether the transmission of the signal complied with the signal format of the ITU-T Recommendation T. 33 is selected. The facsimile transmission is thus performed as the operator intends.

When a communication error occurs subsequent to the transmission of the SUB/DCS signal, the operator checks to see whether the partner facsimile receiver supports the ITUT Recommendation T. 33 in the facsimile communication, in which the plurality of the extension numbers, or the plurality of the secondary telephone numbers, or both the extension number and the secondary telephone number are designated.

Although the above-referenced embodiment is implemented in the facsimile apparatus, the present invention may be implemented in image communication apparatuses other than the facsimile apparatus, for instance, implemented in personal computers having image communication capability.

In accordance with the present invention, the subaddress signal is directly input in the facsimile transmission, with the symbols # and ## input. When the subaddress signal happens to coincide with a signal specified in the ITU-T Recommendation T. 33, the operator checks to see whether the transmission of the signal complied with the signal format of the ITU-T Recommendation T. 33 is selected. The facsimile transmission is thus performed as the operator intends.

Second embodiment

In the first embodiment, the process goes to step S14 in response to a signal from the timer, after the destination is input in step S8. Alternatively, the process goes to step S14 in response to the pressing of the start key in a second embodiment.

Figure 10:
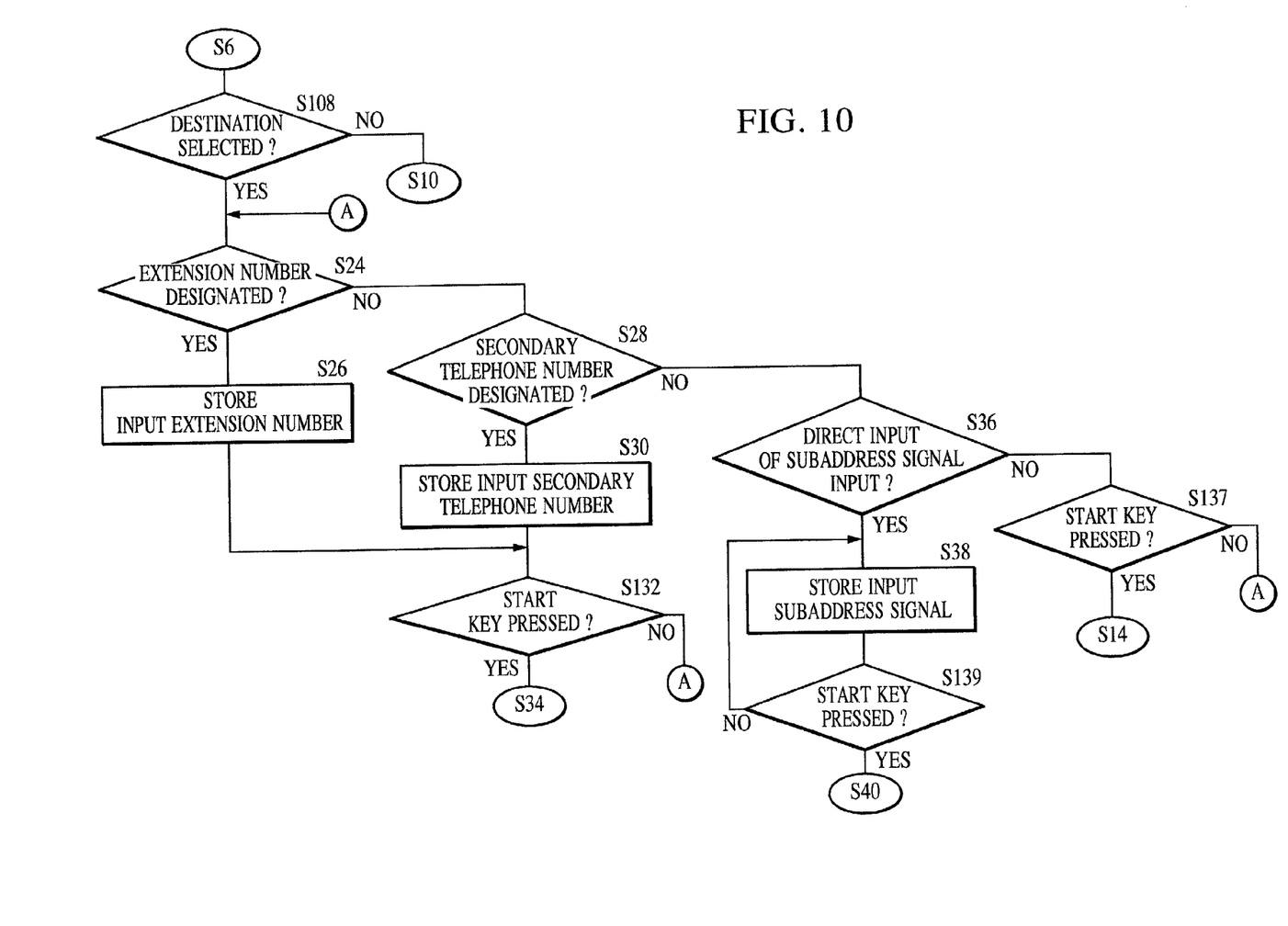
FIG. 10 is a flow diagram showing a second embodiment of the present invention.

The process in the second embodiment is illustrated in FIG. 10.

Steps identical to those discussed in connection with the first embodiment are designated with the same step numbers, and the discussion thereabout is not repeated here.

The process goes from step S6 to step S108 to determine whether a destination has been selected. When it is determined that the destination has been selected, the process goes to step S24, else the process goes to step S10.

In each of steps S132, S139, and S137, a determination is made of whether the start key has been pressed. Depending on the Yes or No answer in each determination, the process goes as indicated in FIG. 10.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image communication apparatus transmitting a subaddress signal, the apparatus comprising:
    extension number input means for inputting a plurality of extension numbers as information of the subaddress signal;
    secondary telephone number input means for inputting a plurality of secondary telephone numbers;
    direct input means for directly inputting particular information; and
    display means for displaying an acknowledge message which is to confirm whether to send the particular information as information in accordance with ITU-T Recommendation T. 33 when the particular information is input from said direct input means,
    wherein the subaddress signal, with the plurality of the extension numbers designated by said extension number input means for inputting the plurality of the extension numbers, or the plurality of the secondary telephone numbers designated by said secondary telephone number input means for inputting the plurality of the secondary telephone numbers, or both the extension number and the secondary telephone number designated by said direct input means for directly inputting the particular information, is transmitted, and a message is displayed if a communication error occurs after the transmission of a SUB/DCS signal.

2. An image communication apparatus according to claim 1, wherein the particular information input by said direct input means is one of the symbols # and ##, and wherein when the input of a plurality of pieces of numerical information delimited by one of the symbols # and ##is selected, a message is displayed to prompt a user to acknowledge the designation of a plurality of extension numbers, the designation of a plurality of secondary telephone numbers, or the designation of an extension number and a secondary telephone number.

3. An image communication apparatus according to claim 2, wherein the displayed message is changed in response to the information of the directly input subaddress.

4. An image communication apparatus according to claim 1, wherein the displayed message prompts a user to check to see whether the partner apparatus has one of the function of receiving the plurality of the extension numbers, the function of receiving the plurality of the secondary telephone numbers, and the function of receiving both the extension number and the secondary telephone number.

5. An image communication apparatus according to claim 1, wherein the image communication apparatus is a facsimile apparatus.

6. An image communication apparatus transmitting a subaddress signal, comprising:
    extension number input means for inputting a plurality of extension numbers as information of the subaddress signal;
    secondary telephone number input means for inputting a plurality of secondary telephone numbers;
    direct input means for directly inputting particular information;
    determination means for determining whether or not the particular information, which is a plurality of extension numbers as information of subaddress signal or a plurality of secondary telephone numbers, is inputted in accordance with ITU-T Recommendation T. 33 by said direct input means; and
    display means for displaying an acknowledge message when the particular information is inputted from said direct input means and when the plurality of extension numbers as information of the sub address signal or a plurality of secondary telephone numbers are determined to be inputted in accordance with ITU-T Recommendation T. 33 by said determination means.

* * * * *

UNITED STATES PATENT AND TRADEMARK OFFICE
CERTIFICATE OF CORRECTION

| | | |
|---|---|---|
| PATENT NO. | : 7,012,707 B2 | Page 1 of 1 |
| APPLICATION NO. | : 09/766609 | |
| DATED | : March 14, 2006 | |
| INVENTOR(S) | : Takehiro Yoshida | |

It is certified that error appears in the above-identified patent and that said Letters Patent is hereby corrected as shown below:

On The Title Page, Item (56) FOREIGN PATENT DOCUMENTS

"10304166 A" should read --10-304166 A--.

COLUMN 3

Line 42, "signal 20b," should read --signal line 20b,--.

COLUMN 8

Line 32, "ITUT" should read --ITU-T--.

COLUMN 10

Line 3, "##is" should read --## is--.

Signed and Sealed this

Fourth Day of September, 2007

JON W. DUDAS
*Director of the United States Patent and Trademark Office*